United States Patent [19]
Miller, Jr. et al.

[11] 3,720,978
[45] March 20, 1973

[54] INDEXING FURNITURE GLIDE

[75] Inventors: Robert E. Miller, Jr., Bronxville, N.Y.; Anthony J. Balchunas, Rahway, N.J.

[73] Assignee: Robert E. Miller & Co., Inc., New York, N.Y.

[22] Filed: Oct. 7, 1971

[21] Appl. No.: 187,335

[52] U.S. Cl. ..................................................16/42
[51] Int. Cl. ..............................................A47b 91/06
[58] Field of Search ............16/42, 42 T, 44, 19; 248/188.9; 151/49, 50

[56] References Cited

UNITED STATES PATENTS

| 3,430,287 | 3/1969 | Schroeder | 16/42 |
| 3,321,243 | 5/1967 | Ferrara | 151/49 |
| 2,998,197 | 8/1961 | Kachergis | 151/49 |

*Primary Examiner*—Bernard A. Gelak
*Assistant Examiner*—Doris L. Troutman
*Attorney*—Albert H. Kirchner

[57] ABSTRACT

A glide, adjustable axially in protruding relation to the hollow leg of an article of furniture, has indexing means comprising leaf springs set on edge and resiliently biased against flats on a foot-ended stud that is threaded up into a nut fixed in the leg, so as yieldably to stop the stud at quarter-turn intervals when the foot is rotated to thread the stud further up into or down from the nut.

7 Claims, 4 Drawing Figures

PATENTED MAR 20 1973 3,720,978

INVENTORS
ROBERT E. MILLER, JR.
ANTHONY J. BALCHUNAS

Albert H. Kirchner

ATTORNEY

INDEXING FURNITURE GLIDE

BACKGROUND OF THE INVENTION

It is frequently necessary to adjust the manufactured effective leg length of an article of furniture to enable the article to be positioned in stable mounting on a floor, particularly on a portion of a floor that may not be accurately smooth or level. This is particularly true in the case of metal furniture, or furniture such as chairs, tables, stools, bedsteads and the like which have legs of tubular metal which are not readily or desirably shortened by cutting, as is possible in the case of wooden legs. Moreover, it is generally required that such legs be tipped with shoes of rubber or the like to provide a cushion mounting of the article on the floor and prevent the scratching and marring that would otherwise result from movement of the naked metal edges across surfaces of wood or tile, or the tearing of rugs and carpets.

Both of these objects are traditionally accomplished by inserting up into each hollow metal leg a small protruding glide that has its lower end provided with a resilient shoe and has its upper end portion threaded into a nut fixed in the leg. Rotating the foot or protruding portion of the glide turns the stud more or less up into or downwardly from the nut and thus alters the effective length of the leg, so that such adjustment of all or some of the generally four legs of a chair, table or the like very effectively compensates for inequalities in the floor on which the article is to be set.

Improvements in the foregoing basic structure have been concerned with yieldably fixing the adjusted position of the stud in the nut, and hence in the spatial relation of the foot to the leg and so as to prevent unintended rotation of the stud and consequent maladjustment of the glide. This has generally required the use of spring means in the glide assembly, with means presetting the spring at a desirable degree of tension or pressure, but difficulty has been experienced with continued use causing variations in the spring force. The present invention involves use of a novel type of spring element, cooperating with the adjusting stud in a new manner so as permanently to maintain the originally pre-set spring force and producing general improvement in the glide structure and function, as will now be explained.

SUMMARY OF THE INVENTION

The invention differs from the best prior art devices known to the present inventors by providing a novel relationship of special leaf spring means and flat sided stud means for yieldably holding the stud in any of its multiplicity of adjusted positions in the leg so as to "index" those positions, i.e., to mark the movements in adjustment, as by stops or clicking sounds, or both, so as to facilitate accurate adjustment to predetermined values and to hold the parts in the set position against all accidental movement in maladjustment.

This is accomplished by a new combination of elements that are very inexpensive to make and to assemble, and which provide a simple mechanism that is proof against wear and accidental disassembly, and which will be operative to set the glide at unusually small increments of adjustment, i.e., at quarter turns of the foot.

An embodiment of the invention which has been thoroughly tested and found to be entirely satisfactory, and which accordingly is at present preferred, has been selected to illustrate the principles of the invention and is shown in the accompanying drawings.

SHORT DESCRIPTION OF THE FIGURES

DESCRIPTION OF THE PREFERRED EMBODIMENT

Figure 1:
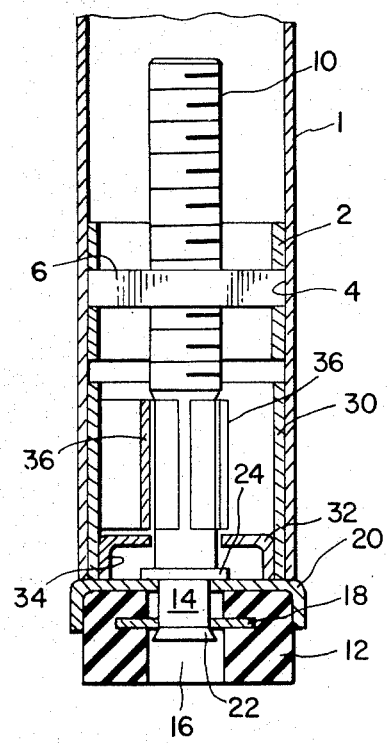
FIG. 1 is an axial cross sectional view taken through the square tubular metal leg of an article of furniture, showing a glide embodying the principles of the invention installed and set at the short end of its range of adjustment.

In these figures, the reference numeral 1 designates the lower end portion of a metal leg or foot of any one of many specifically different kinds of articles of furniture, e.g., tables, chairs, stools, bedsteads and the like. The leg is of hollow or tubular shape, in the particular case chosen for illustration being made of extruded or sheet metal and being square in cross section. Driven up into the leg from its open bottom end is a short section 2 having an outer shape corresponding in part to the internal shape of the leg and making a tight fit therein. If the leg is four-sided, the section 2 may also be four-sided, or it could be a channel section, i.e., three-sided. In any case, whatever be the shape of the leg hollow, the section 2 is tightly wedged or otherwise fixed therein, a short distance up above the leg bottom edge, and two opposite sides of the section are notched or slotted as shown at 4 to receive and hold a nut 6 non-rotatably in the leg. In the embodiment shown in the drawing the section 2 is three-sided or channel shaped; the slots 4 are formed in the two spaced opposed flanges of the channel; and the nut is square, of substantially the size of the leg hollow. The section is fixed in the leg by the spring expansion of the section flanges and thus performs its sole function of securing the nut 6 at a fixed location up in the leg, a function which, within the spirit of the invention, could as well be performed by any other suitable means.

The glide provided by the invention comprises principally a stud 10 which has its upper end portion threaded into the nut 6 and has a suitable cushioning pad such as a rubber foot 12 non-rotatably mounted on its lower end. The foot is best made to conform to the cross sectional shape of the leg, being therefore square, as shown, in the illustrated embodiment. It is secured against rotation on the stud in any convenient manner, preferably as shown in the drawing, by having the lower end portion of the stud formed with flattened sides 14, four in number, so that the lower portion is square instead of round in cross section, and having this portion extend into a square hole 16 cut axially through the foot, passing also through square holes in a plate 18 embedded in the foot and in a cap 20 topping the foot and partially encasing it by downturned edge flanges. The end of the stud may be peened over the margins of the opening in the plate 18, as shown at 22, so as to compress the plate 18, cap 20, and intervening material of the foot up against a small washer 24 that is held on the stud by a drive fit on the squared portion thereof, thus securing rigidly together the assembly of stud, foot and cap.

Figure 2:
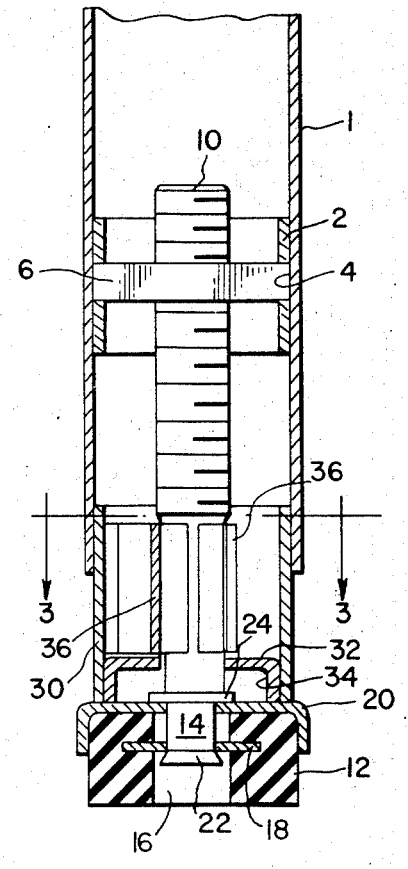
FIG. 2 is a similar view but showing the glide set in a position near its maximum effective length.
Figure 4:
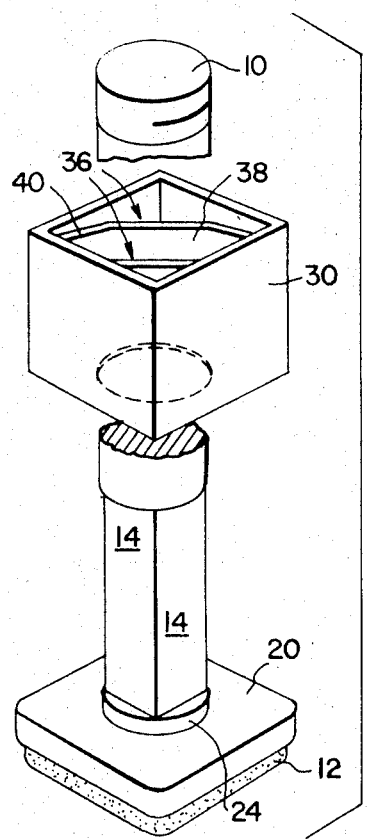
FIG. 4 is a transverse cross sectional view taken on the line 3—3 of FIG. 2.

This assembly of footed stud is mounted in the leg 1 by threading the upper portion of the stud into the nut 6 which is fixed in the leg, and adjustment is made, to set the foot at any degree of projection from the end of the leg, substantially between the limits suggested respectively by FIGS. 1 and 2, by rotating the foot and thus turning the stud further into or out of the leg.

Broadly speaking, such relationship of stud and a nut fixed in a leg is old in the art. The better adjustable glide constructions include some kind of indexing means for yieldably fixing the stud at selected degrees of penetration in the leg so that the selected setting will be maintained against unintended maladjustment and yet can readily be changed at will and restored as may be desired more or less accurately to some preadjustment. It is the peripheral purpose of the present invention to provide improved indexing means for this purpose.

Figure 3:
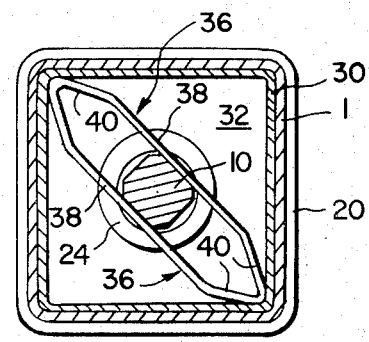
FIG. 3 is an exploded perspective view of principal elements of the new glide.

For this purpose the foot has loosely standing on top of the cap 20 a box housing 30 which has an exterior shape corresponding and conforming to that of the interior of the leg and is slidably telescoped in the leg. Thus, in the presently illustrated form of glide assembly, the housing 30 is of square cross section. A spacer washer 32 having peripheral downturned edge flanges 34 that rest on the cap 20 is fixed in the bottom of the bottom of the housing 30 and has an axial hole through which the stud extends. The shank portion of the stud that is thus enclosed within the housing, and is well centered therein by the axial alignment of the threaded opening in the nut 6 and the unthreaded opening in the washer 32, is deformed from its originally round shape so as to have four flat faces, which may be and preferably are continuations of the flats 14 heretofore explained. Resting on the platform provided by the washer 32 are two leaf springs 36, each having a height no greater than that of the housing and being of flattened bow shape, with a central area 38 that is flat and is yieldably pressed against one of the flat faces 14 of the stud shank by the resilience of the bowed ends 40 that are fitted into diagonally opposite corners of the box housing. As is best seen in FIG. 3, the two flat central areas of the springs are parallel to each other, and they bear flatwise on opposite flat faces of the stud shank. Thus they hold the stud yieldably against rotation in the leg 1, with however freedom to turn by snap movement and audible clicking to index the stud to new positions further in or out of the leg. In these movements the stud carries with it the foot 12, which is thus yieldably fixed, at quarter-turn increments, anywhere between or somewhat beyond the well extended position of FIG. 2 and the fully retracted position of FIG. 1.

It is believed to be clear from the foregoing brief description of the preferred embodiment that the invention accomplishes all the objects, and is productive of all the advantages, hereinabove set forth, and that these results are attained principally by novel spring mechanism that constantly and permanently exerts its predetermined resilient force, being devoid of spring anchorages or abutments as used in the prior art which in time become subject to movement with the result that the spring becomes loosened and the spring force reduced.

Within the broad principles of the invention as defined by the appended claims the illustrated specific embodiment may be altered and modified to different forms without departure from the scope and purview of the claims.

We claim:

1. An adjustable indexing glide for a hollow leg of an article of furniture comprising:
    a nut,
    means for fixing the nut up in the lower end portion of said hollow leg,
    a housing insertible into the leg below the nut and having opposite internal corners,
    a stud having a shank extending up through the housing and threaded into the nut,
    a foot non-rotatably fixed on the lower end of the stud for projecting from the lower end of the leg,
    a portion of the stud shank within the housing having at least one flat side,
    and a leaf spring having its ends lodged within said opposite corners of the housing, and having a flat area resiliently biased against said flat side of the stud shank yieldably opposing rotation of the stud,
    thereby indexing the degree to which the stud penetrates the nut on rotation therein and hence the extent to which the foot projects from the leg.

2. An adjustable indexing glide as claimed in claim 1 in which the named portion of the stud shank is square in cross section, thus providing four flat sides for cooperation with the leaf spring.

3. An adjustable indexing glide as claimed in claim 1 in which the named portion of the stud shank has two oppositely disposed flat sides and the leaf springs are two in number, each biased against one of the flat sides of the shank.

4. An adjustable indexing glide as claimed in claim 1 in which the named portion of the stud shank is square in cross section, and the leaf springs are two in number, each biased against one of the two opposite sides of said square portion of the shank.

5. An adjustable indexing glide as claimed in claim 1, in which the housing is square in cross section adapted to fit up into a leg that is square in cross section and providing two diagonally opposite internal corners,
    and including two leaf springs,
    each having its ends fixed in said two opposite internal corners of the housing.

6. An adjustable indexing glide as claimed in claim 1 in which the foot comprises a cushion surmounted by a cap providing a platform for the lower edge of the leaf spring.

7. An adjustable indexing glide for a square tubular leg of an article of furniture comprising
    a nut,
    means fixing said nut up in the lower end portion of said leg,
    a stud threaded into said nut having a shank extending toward the lowe end of the leg and providing a portion which is square in cross section, thereby having four flat sides, a cushion foot non-rotatably fixed on the lower end of the stud and projecting from the lower end of the leg, a box housing having an external shape and size conforming to the internal shape and size of the leg, adapted to fit up into the leg below the nut and providing two diagonally opposite internal corners, and two leaf springs, each having its ends fixed in said two opposite internal corners of the housing and its intermediate area resiliently biased against an opposite flat side of the named portion of the shank, thereby indexing the degree to which the stud penetrates the nut on rotation and hence the extent to which the foot projects from the leg.

* * * * *